R. SMITH.
Milk-Coolers.
No. 157,138. Patented Nov. 24, 1874.
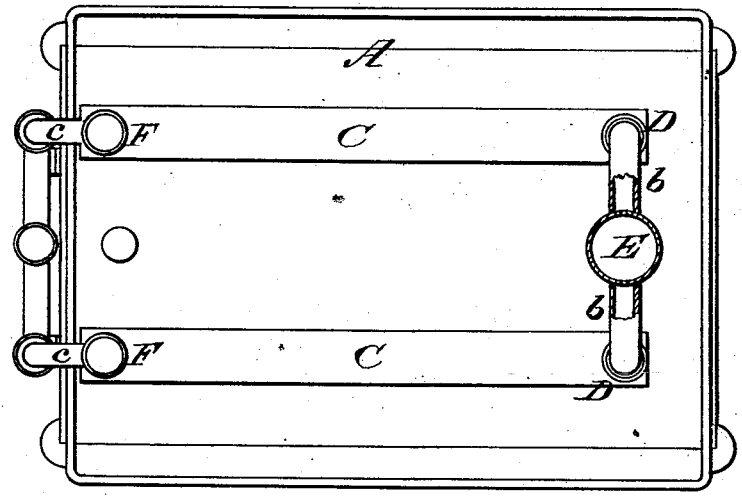
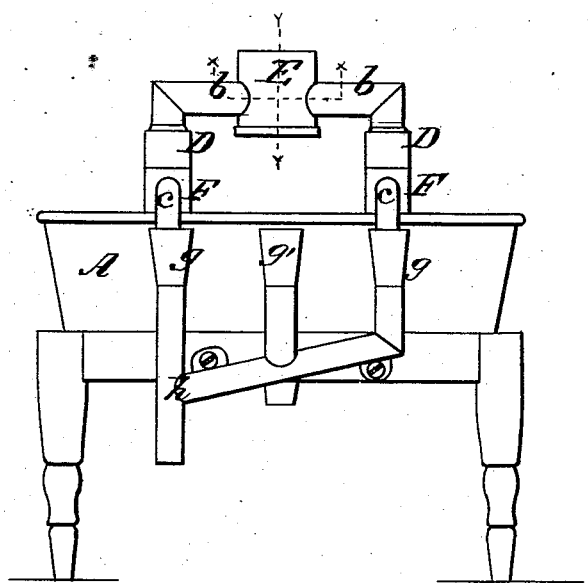
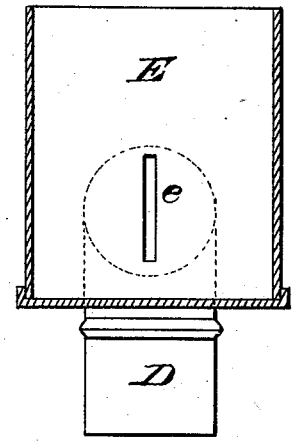
2 Sheets--Sheet 1.
WITNESSES
INVENTOR
Russell Smith
ATTORNEYS 2 Sheets--Sheet 2.

R. SMITH.
Milk-Coolers.

No. 157,138. Patented Nov. 24, 1874.

WITNESSES
Robert Everitt
E. H. Bates

INVENTOR
Russell Smith,
Chipman & Hosmer & Co,
ATTORNEYS

UNITED STATES PATENT OFFICE.

RUSSELL SMITH, OF RICHFORD, VERMONT.

IMPROVEMENT IN MILK-COOLERS.

Specification forming part of Letters Patent No. 157,138, dated November 24, 1874; application filed September 30, 1874.

*To all whom it may concern:*

Be it known that I, RUSSELL SMITH, of Richford, in the county of Franklin and State of Vermont, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 4:
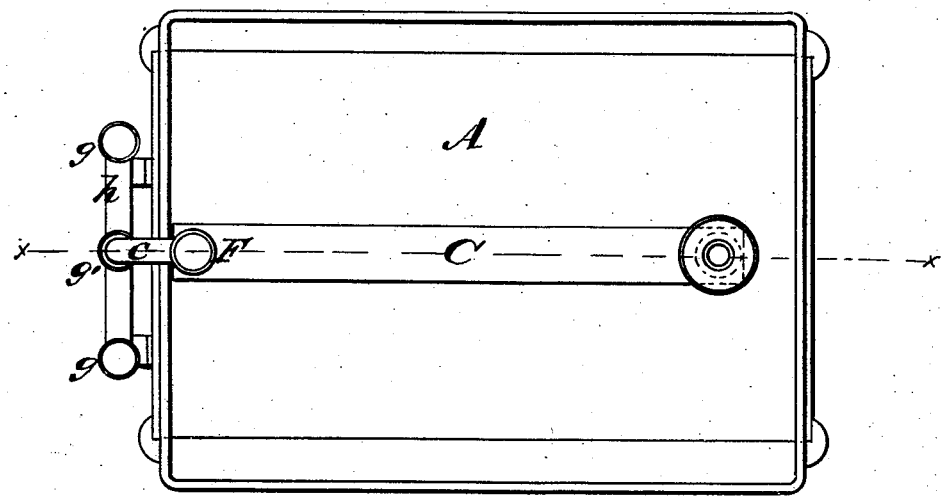

Figure 1 of the drawing is a representation of a plan view of my milk-cooler, and Fig. 2 is an end view. Fig. 3 is a detail view, Fig. 4 a plan view, Fig. 5 a sectional view, and Fig. 6 a detail view, of the same.

My invention has relation to means for keeping milk at the proper temperature for raising cream; and the nature of my invention consists in tubes, triangular in cross-section, situated in the milk-reservoir to prevent cream from lodging on them, in combination with a cistern for hot or cold water, provided with slotted outlets, connecting, and discharging tubes, as will be hereinafter more fully described.

In the annexed drawings, A designates a pan, of any suitable capacity, which is preferably made rectangular, and with outwardly-flaring sides. This pan is supported upon a rack, B, or its equivalent. C C designate tubes, which are sustained on the bottom of the pan A by legs *a a*, and upon one edge of the pan by angular outlet-tubes *c c*. In cross-section the tubes are triangular, and are made of this form to prevent cream from lodging on them. Any other form of tube will collect cream; but the inclined sides allow the cream to ascend through the milk without obstruction. D D are pipes rising perpendicularly from the ends of the tubes C C, and receiving the ends of the branch pipes *b b*, which lead out of a cistern, E, and conduct water from the latter into the tubes C C. The outlets from cistern E are narrow slots *e*, which will discharge the water in equal quantities into pipes C C, so that there will be an even temperature of the milk in the pan. F F designate two pipes, from which the water is discharged through the angular outlet-tubes *c c*. These tubes empty into branch tubes *g g*, and the latter empty into a discharge-tube, *h*. The tubes *g g g'* and *h* are permanently secured to the rack B.

Figure 5:
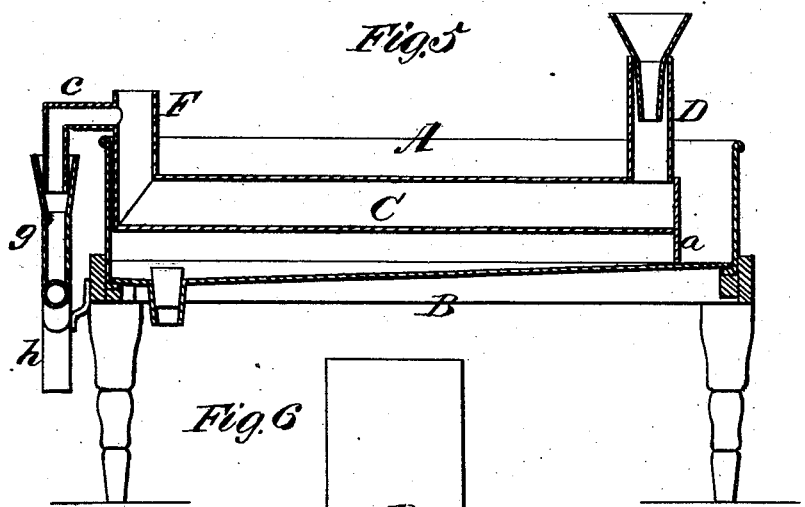
Figure 6:
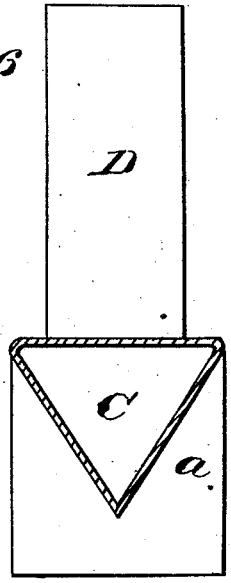

If only one tube, C, is required, the cistern E is omitted, and a funnel used in its stead, as shown in Figs. 5 and 6, and the outlet *c* is inserted into the intermediate tube *g'*.

What I claim as new, and desire to secure by Letters Patent, is—

1. The tubes C C, triangular in cross-section, in combination with the milk-reservoir A, cistern E, provided with the slotted outlets *e e*, connecting-tubes *b b*, and discharge-tubes, substantially as and for the purpose set forth.

2. The tubes C C, triangular in cross-section, in combination with the milk-reservoir A, substantially as described, and for the purpose set forth.

In testimony that I claim the above I have hereunto subscribed my name in the presence of two witnesses.

RUSSELL SMITH.

Witnesses:
J. G. POWELL,
CHARLES B. SMITH.